United States Patent
Wang et al.

(10) Patent No.: US 11,134,517 B2
(45) Date of Patent: Sep. 28, 2021

(54) METHOD FOR INDICATING AND DETERMINING START TRANSMISSION TIMING OF A SUBFRAME, AND BASE STATION AND USER EQUIPMENT

(71) Applicant: NTT DOCOMO INC., Tokyo (JP)

(72) Inventors: Jing Wang, Beijing (CN); Liu Liu, Beijing (CN); Huiling Jiang, Beijing (CN); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,499

(22) PCT Filed: Aug. 11, 2017

(86) PCT No.: PCT/CN2017/097132
§ 371 (c)(1),
(2) Date: Feb. 8, 2019

(87) PCT Pub. No.: WO2018/028684
PCT Pub. Date: Feb. 15, 2018

(65) Prior Publication Data
US 2019/0174541 A1    Jun. 6, 2019

(30) Foreign Application Priority Data
Aug. 11, 2016  (CN) .......................... 201610658521.5

(51) Int. Cl.
*H04W 74/08* (2009.01)
*H04W 72/04* (2009.01)
(Continued)

(52) U.S. Cl.
CPC .......... *H04W 74/0808* (2013.01); *H04L 1/00* (2013.01); *H04W 72/04* (2013.01);
(Continued)

(58) Field of Classification Search
CPC ............. H04W 74/0816; H04W 52/02; H04W 72/042; H04W 72/0446; H04W 72/10; H04W 72/12; H04W 74/006; Y02D 70/00
See application file for complete search history.

(56) References Cited

U.S. PATENT DOCUMENTS

| 2015/0172039 A1 | 6/2015 | Kim et al. |
| 2015/0181576 A1 | 6/2015 | Papasakellariou et al. |
| 2016/0219547 A1 | 7/2016 | Seo et al. |

FOREIGN PATENT DOCUMENTS

| CN | 102783053 A | 11/2012 |
| CN | 105850058 A | 8/2016 |

(Continued)

OTHER PUBLICATIONS

LG Electronics, "LBT schemes in LAA UL", R1-160630, St. Julian's, Malta, Feb. 15-19, 2016 (Year: 2016).*

(Continued)

*Primary Examiner* — Eric Myers
(74) *Attorney, Agent, or Firm* — Osha Bergman Watanabe & Burton LLP (57) ABSTRACT

Provided are a method for indicating and determining a start transmission timing of a subframe of a physical uplink shared channel, and a base station and a user equipment. The method includes: receiving downlink control information from a base station, the downlink control information comprising indication information about the start transmission timing, and a listen before talk (LBT) type; determining the structure of the previous subframe to the current subframe; and determining, from four timings different from one another, the start transmission timing of the current subframe based on the indication information, the LBT type, and the structure of the previous subframe.

8 Claims, 6 Drawing Sheets

(51) Int. Cl.
  *H04L 1/00* (2006.01)
  *H04W 72/14* (2009.01)
(52) U.S. Cl.
  CPC ... *H04W 72/0413* (2013.01); *H04W 72/0446* (2013.01); *H04W 72/14* (2013.01)

(56) References Cited

FOREIGN PATENT DOCUMENTS

WO   WO-2015141584 A1   9/2015
WO   2016/081375 A1     5/2016

OTHER PUBLICATIONS

International Search Report for PCT/CN2017/097132, ISA/CN, Haidian District, dated Oct. 27, 2017, with English translation attached.
Huawei et al., PHY Signaling Design for eLAA, 3GPP TSG RAN WG1 Meeting #85 R1-164829, May 27, 2016 (May 27, 2016), sections 2-5.
Nokia et al., "eLAA UL Scheduling/UL Grant Details", 3GPP TSG RAN WG1 meeting #85 R1-164941, May 27, 2016 (May 27, 2016), sections 3-4.
Ericsson et al., "RAN1 Agreements, Working Assumptions and Conclusions for Rel-14 Enhanced LAA", 3GPP TSG RAN WG1 Meeting #85 R1-166049, May 27, 2016 (May 27, 2016), chapter 1.1.
International Preliminary Report on Patentability for PCT/CN2017/097132, ISA/CN, Haidian District, dated Feb. 12, 2019, with English translation attached.
Office Action issued in the counterpart Chinese Patent Application No. 201780048844.5, dated Apr. 26, 2021 (13 pages).
Office Action issued in the counterpart Japanese Patent Application No. 2019-507114, dated Apr. 27, 2021 (10 pages).
Huawei, HiSilicon; "PHY signaling design for eLAA"; 3GPP TSG RAN WG1 Meeting #85, R1-164829; Nanjing, China May 23-27, 2016 (5 pages).
Ericsson, Huawei; "RAN1 Agreements, Working Assumptions and Conclusions for Rel-14 Enhanced LAA"; 3GPP TSG RAN WG1 Meeting #85, R1-166049; Nanjing, China; May 23-27, 2015 (14 pages).
Havish Koorapaty, Ericsson; "Status Report to TSG"; 3GPP TSG RAN meeting #72, RP-161153; Busan, Korea; Jun. 13-16, 2016 (16 pages).
Nokia, Alcatel-Lucent Shanghai Bell; "eLAA UL scheduling/UL grant details"; 3GPP TSG RAN WG1 Meeting #85, R1-164941; Nanjing, China; May 23-27, 2016 (9 pages).

\* cited by examiner

METHOD FOR INDICATING AND DETERMINING START TRANSMISSION TIMING OF A SUBFRAME, AND BASE STATION AND USER EQUIPMENT

CROSS-REFERENCE TO RELATED APPLICATIONS

This application is a 371 U.S. National Stage of International Application No. PCT/CN2017/097132, filed on Aug. 11, 2017, which claims priority to Chinese Application No. 201610658521.5, filed on Aug. 11, 2016. The entire disclosures of the above applications are incorporated herein by reference.

TECHNICAL FIELD

The present disclosure relates to a field of mobile communications, and particularly to a method for determining a start transmission timing of a subframe for a physical uplink shared channel in a user equipment, a method for indicating a start transmission timing of a subframe for a physical uplink shared channel in a base station, and a base station and a user equipment.

BACKGROUND

In the grant-free spectrum transmission technology studied in recent years, start transmission timing of the Physical Uplink Shared Channel (PUSCH) transmission is under discussion.

In the current Third Generation Partnership Project (3GPP) protocols, the indication signaling for the PUSCH start transmission timing has only one bit, which is used to indicate the PUSCH transmission in the uplink subframe starts from the 0th symbol or the 1st symbol.

However, in practice, the actual start transmission timing of the PUSCH transmission currently agreed includes four possible timings: a 0th symbol, a 1st symbol, a timing at which 25 µs elapses after the 0th symbol, and a timing at which 25 µs and a Timing Advance (TA) value elapse after the 0th symbol.

Therefore, regardless of the single frame scheduling or the multi-frame scheduling, there is a problem that the indication signaling for the PUSCH start transmission timing cannot indicate every possibility of the actual start transmission timing of the PUSCH transmission.

SUMMARY

According to an embodiment of the present disclosure, there is provided a method for determining a start transmission timing of a subframe for a physical uplink shared channel in a user equipment, comprising: receiving downlink control information from a base station, the downlink control information including indication information of the start transmission timing and a listen-before-talk LBT type; determining structure of a previous subframe of a current subframe; and determining, from four timings different from one another, the start transmission timing of the current subframe based on the indication information, the LBT type, and the structure of the previous subframe.

In the method according to the embodiment, determining structure of a previous subframe of a current subframe comprises: when the user equipment is not scheduled in the previous subframe, or when the previous subframe is a blank subframe, or when the user equipment is scheduled through the same uplink grant in the previous subframe, determining the previous subframe as a complete uplink subframe.

In the method according to the embodiment, the indication information is used to indicate one of a 1st symbol and a 0th symbol; or the indication information is used to indicate one of a 1st symbol and a non-1st symbol; or the indication information is used to indicate one of a 0th symbol and a non-0th symbol.

In the method according to the embodiment, the indication information is used to indicate one of the 1st symbol and the 0th symbol; or the indication information is used to indicate one of the 1st symbol and the non-1st symbol; the LBT type is one of a second type LBT and a fourth type LBT; the structure of the previous subframe is one of a complete uplink subframe, a complete downlink special subframe, a complete downlink subframe, a last-symbol-blank uplink subframe, a last-symbol-blank downlink special subframe, and a last-symbol-blank downlink subframe; the step of determining the start transmission timing of the current subframe comprises: when the indication information indicates the 1st symbol, determining that the start transmission timing is the 1st symbol; when the indication information indicates the 0th symbol or the non-1st symbol, the LBT type is the second type LBT, and the structure of the previous subframe is the complete uplink subframe or the complete downlink special subframe, determining that the start transmission timing is a timing at which a predetermined value elapses after the 0th symbol; when the indication information indicates the 0th symbol or the non-1st symbol, the LBT type is the second type LBT, and the structure of the previous subframe is the complete downlink subframe, determining that the start transmission timing is a timing at which the predetermined value and a timing advance value elapse after the 0th symbol; when the indication information indicates the 0th symbol or the non-1st symbol, and the structure of the previous subframe is the last-symbol-blank uplink subframe or the last-symbol-blank downlink special subframe or the last-symbol-blank downlink subframe, determining that the start transmission timing is the 0th symbol.

In the method according to the embodiment, the indication information is used to indicate one of the 0th symbol and the non-0th symbol; the LBT type is one of a second type LBT and a fourth type LBT; the structure of the previous subframe is one of a complete uplink subframe, a complete downlink special subframe, a complete downlink subframe, a last-symbol-blank uplink subframe, a last-symbol-blank downlink special subframe, and a last-symbol-blank downlink subframe; the step of determining the start transmission timing of the current subframe comprises: when the indication information indicates the 0th symbol, determining that the start transmission timing is the 0th symbol; when the indication information indicates the non-0th symbol, the LBT type is the second type LBT, and the structure of the previous subframe is the complete uplink subframe or the complete downlink special subframe, determining that the start transmission timing is a timing at which a predetermined value elapses after the 0th symbol; when the indication information indicates the non-0th symbol, the LBT type is the second type LBT, and the structure of the previous subframe is the complete downlink subframe, determining that the start transmission timing is a timing at which the predetermined value and a timing advance value elapse after the 0th symbol; when the indication information indicates the non-0th symbol and the LBT type is the fourth type LBT, determining that the start transmission timing is the 1st symbol.

According to another embodiment of the present disclosure, there is provided a user equipment for determining a start transmission timing of a subframe for a physical uplink shared channel in a user equipment, comprising: a receiving unit, configured to receive downlink control information from a base station, the downlink control information including indication information of the start transmission timing and a listen-before-talk LBT type; a subframe structure determining unit, configured to determine a structure of a previous subframe of a current subframe; and a transmission timing determining unit, configured to determine, from four timings different from one another, the start transmission timing of the current subframe based on the indication information, the LBT type, and the structure of the previous subframe.

In the user equipment according to the embodiment, the subframe structure determining unit is configured to: when the user equipment is not scheduled in the previous subframe, or when the previous subframe is a blank subframe, or when the user equipment is scheduled through the same uplink grant in the previous subframe, determine the previous subframe as a complete uplink subframe.

In the user equipment according to the embodiment, the indication information is used to indicate one of a 1st symbol and a 0th symbol; or the indication information is used to indicate one of a 1st symbol and a non-1st symbol; or the indication information is used to indicate one of a 0th symbol and a non-0th symbol.

In the user equipment according to the embodiment, the indication information is used to indicate one of a 1st symbol and a 0th symbol; or the indication information is used to indicate one of a 1st symbol and a non-1st symbol; the LBT type is one of a second type LBT and a fourth type LBT; the structure of the previous subframe is one of a complete uplink subframe, a complete downlink special subframe, a complete downlink subframe, a last-symbol-blank uplink subframe, a last-symbol-blank downlink special subframe, and a last-symbol-blank downlink subframe; the transmission timing determining unit is configured to: when the indication information indicates the 1st symbol, determine that the start transmission timing is the 1st symbol; when the indication information indicates the 0th symbol or the non-1st symbol, the LBT type is the second type LBT, and the structure of the previous subframe is the complete uplink subframe or the complete downlink special subframe, determine that the start transmission timing is a timing at which a predetermined value elapses after the 0th symbol; when the indication information indicates the 0th symbol or the non-1st symbol, the LBT type is the second type LBT, and the structure of the previous subframe is the complete downlink subframe, determine that the start transmission timing is a timing at which the predetermined value and a timing advance value elapse after the 0th symbol; when the indication information indicates the 0th symbol or the non-1st symbol, and the structure of the previous subframe is the last-symbol-blank uplink subframe or the last-symbol-blank downlink special subframe or the last-symbol-blank downlink subframe, determine that the start transmission timing is the 0th symbol.

In the user equipment according to the embodiment, the indication information is used to indicate one of the 0th symbol and the non-0th symbol; the LBT type is one of a second type LBT and a fourth type LBT; the structure of the previous subframe is one of a complete uplink subframe, a complete downlink special subframe, a complete downlink subframe, a last-symbol-blank uplink subframe, a last-symbol-blank downlink special subframe, and a last-symbol-blank downlink subframe; the transmission timing determining unit is configured to: when the indication information indicates the 0th symbol, determine that the start transmission timing is the 0th symbol; when the indication information indicates the non-0th symbol, the LBT type is the second type LBT, and the structure of the previous subframe is the complete uplink subframe or the complete downlink special subframe, determine that the start transmission timing is a timing at which a predetermined value elapses after the 0th symbol; when the indication information indicates the non-0th symbol, the LBT type is the second type LBT, and the structure of the previous subframe is the complete downlink subframe, determine that the start transmission timing is a timing at which the predetermined value and a timing advance value elapse after the 0th symbol; when the indication information indicates the non-0th symbol and the LBT type is the fourth type LBT, determine that the start transmission timing is the 1st symbol.

According to still another embodiment of the present disclosure, there is provided a method for determining a start transmission timing of a subframe for a physical uplink shared channel in a user equipment, comprising: receiving downlink control information from a base station, the downlink control information including first indication information used for a start transmission timing, the first indication information including at least two bits; and in a case where multi-subframe scheduling is performed and the downlink control information further includes second indication information used for a start transmission timing, when the second indication information indicates that a start transmission timing of the current subframe is not a first timing, determining the start transmission timing of the current subframe from a second timing, a third timing and a fourth timing, which are different from the first timing, based on the first indication information.

In the method according to the embodiment, the first timing is a 1st symbol, the second timing, the third timing and the fourth timing each are one of a 0th symbol, a timing at which a predetermined value elapses after the 0th symbol, and a timing at which the predetermined value and a timing advance value elapse after the 0th symbol; or the first timing is a 0th symbol, the second timing, the third timing and the fourth timing each are one of a lth symbol, a timing at which a predetermined value elapses after the 0th symbol, and a timing at which the predetermined value and a timing advance value elapse after the 0th symbol.

According to still another embodiment of the present disclosure, there is provided a user equipment for determining a start transmission timing of a subframe for a physical uplink shared channel, comprising: a receiving unit, configured to receive downlink control information from a base station, the downlink control information including first indication information used for a start transmission timing, the first indication information including at least two bits; and a transmission timing determining unit, configured to, in a case where multi-subframe scheduling is performed and the downlink control information further includes second indication information used for a start transmission timing, when the second indication information indicates that a start transmission timing of the current subframe is not a first timing, determine the start transmission timing of the current subframe from a second timing, a third timing and a fourth timing, which are different from the first timing, based on the first indication information.

In the user equipment according to the embodiment, the first timing is a 1st symbol, the second timing, the third timing and the fourth timing each are one of a 0th symbol, a timing at which a predetermined value elapses after the 0th symbol, and a timing at which the predetermined value and a timing advance value elapse after the 0th symbol; or the first timing is a 0th symbol, the second timing, the third timing and the fourth timing each are one of a lth symbol, a timing at which a predetermined value elapses after the 0th symbol, and a timing at which the predetermined value and a timing advance value elapse after the 0th symbol.

According to still another embodiment of the present disclosure, there is provided a method for indicating a start transmission timing of a subframe for a physical uplink shared channel in a base station, comprising: generating downlink control information, the downlink control information including first indication information used for a start transmission timing, the first indication information including at least two bits; and sending the downlink control information to a user equipment; wherein in a case where the first indication information is used for performing multi-subframe scheduling and the downlink control information further includes second indication information used for a start transmission timing, when the second indication information indicates that the start transmission timing of the current subframe of the user equipment is not a first timing, the start transmission timing of the current subframe is indicated from a second timing, a third timing and a fourth timing, which are different from the first timing; or in a case where the first indication information is used for performing single subframe scheduling, or in a case where multi-subframe scheduling is performed and the downlink control information does not include the second indication information, the start transmission timing of the current subframe is indicated from the first timing, the second timing, the third timing and the fourth timing.

According to still another embodiment of the present disclosure, there is provided a base station for indicating a start transmission timing of a subframe for a physical uplink shared channel in a base station, comprising: a generating unit, configured to generate downlink control information, the downlink control information including first indication information used for a start transmission timing, the first indication information including at least two bits; and a sending unit, configured to send the downlink control information to a user equipment; wherein in a case where the first indication information is used for performing multi-subframe scheduling and the downlink control information further includes second indication information used for a start transmission timing, when the second indication information indicates that the start transmission timing of the current subframe of the user equipment is not a first timing, the start transmission timing of the current subframe is indicated from a second timing, a third timing and a fourth timing, which are different from the first timing; or in a case where the first indication information is used for performing single subframe scheduling, or in a case where multi-subframe scheduling is performed and the downlink control information does not include the second indication information, the start transmission timing of the current subframe is indicated from the first timing, the second timing, the third timing and the fourth timing.

In the method for indicating and determining start transmission timing of a subframe, the user equipment and the base station according to the embodiment of the present disclosure, the start transmission timing of the current subframe can be determined from more than two transmission timings.

BRIEF DESCRIPTION OF THE DRAWINGS

The foregoing and other objects, features and advantages of the present disclosure will become more apparent from the detailed description of the embodiments of the present disclosure in conjunction with the accompanying drawings. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by a person skilled in the art without paying inventive efforts should all fall into the protection scope of the present disclosure.

Figure 1:
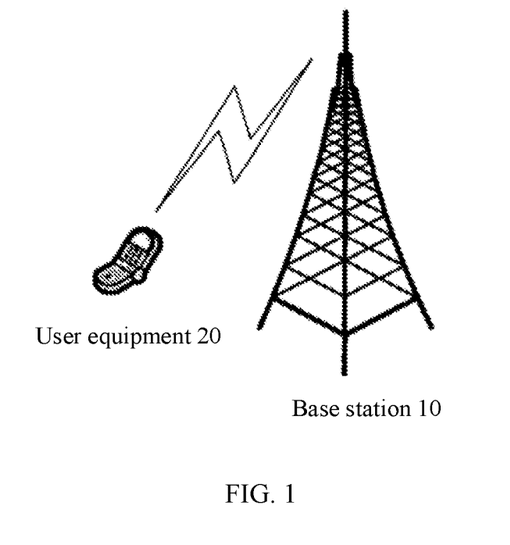
FIG. 1 is a schematic diagram of a system to which a method for indicating and determining a start transmission timing of a subframe is applied according to an embodiment of the present disclosure.

FIG. 1 is a schematic diagram of a system to which a method for indicating and determining a start transmission timing of a subframe is applied according to an embodiment of the present disclosure. As shown in FIG. 1, the system comprises a base station 10 and a user equipment 20, the system can be applied to scenarios of grant-free spectrum transmission. In the system shown in FIG. 1, the base station 10 sends downlink control information to the user equipment 20. The user equipment 20 receives and detects the downlink control information to perform PUSCH transmission based on the indication information in the downlink control information.

Specifically, on the one hand, the user equipment 20 may perform PUSCH transmission at four timings different from one another. The four timings are, for example, a 0th symbol, a 1st symbol, a timing at which a predetermined value (e.g., 25 µs) elapses after the 0th symbol, and a timing at which the predetermined value and a TA value (e.g., 25 µs+TA value) elapse after the 0th symbol.

On the other hand, either in the case of single subframe scheduling or in the case of multi-subframe scheduling, the current indication information can only indicate two timings different from one another.

Specifically, in the case of single subframe scheduling, the indication information can only indicate one of the 0th symbol and the 1st symbol. In the case of multi-subframe scheduling, there are a first option that the start transmission timing is only applicable to a first scheduled subframe among a plurality of scheduled subframes, and a second option that the start transmission timing is applicable to one or more scheduled subframes among a plurality of scheduled subframes. Further, the second option may include a first sub-option adopting a 2-bit joint indication, a second sub-option adopting a bitmap, or a third sub-option adopting a (1+x)-bit indication. If the indication information is applied to the first option described above, it can only indicate one of the 0th symbol and the 1st symbol. If the indication information is applied to any sub-option of the second option described above, it can only indicate one of the 0th symbol and the non-0th symbol, or one of the 1st symbol and the non-1st symbol.

Accordingly, in order to enable an actual start transmission timing of a subframe for PUSCH transmission to be determined based on the indication information, the inventor has devised a method for indicating and determining a start transmission timing of a subframe, and a base station and a user equipment according to the embodiment of the present disclosure.

Figure 2:
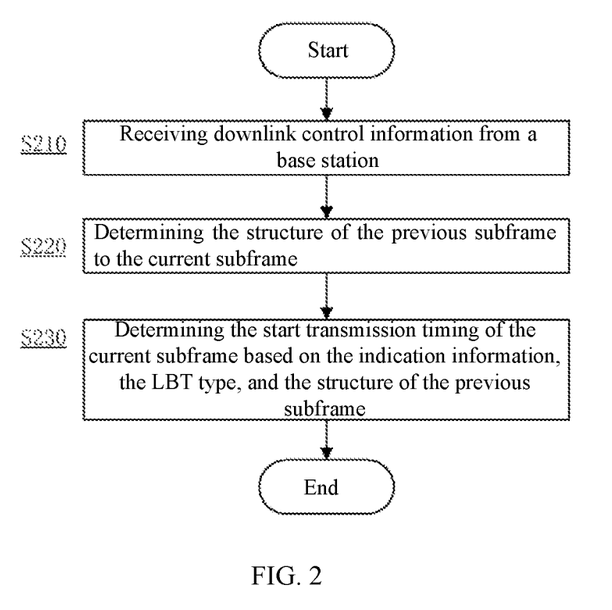
FIG. 2 is a flowchart illustrating main steps of a method for determining a start transmission timing of a subframe according to a first embodiment of the present disclosure.

Hereinafter, first, a method for determining a start transmission timing of a subframe for a physical uplink shared channel in a user equipment according to a first embodiment of the present disclosure will be described in detail with reference to FIG. 2.

First, in step S210, the user equipment receives downlink control information from a base station. Specifically, the downlink control information may include indication information of the start transmission timing and a listen-before-talk LBT type.

Next, in step S220, the structure of a previous subframe of the current subframe is determined.

Specifically, the previous subframe of the current subframe may be one of an uplink subframe, a downlink subframe and a downlink special subframe. More specifically, the uplink subframe may be classified as a complete uplink subframe and a last-symbol-blank uplink subframe. The downlink subframe may be classified as a complete downlink subframe and a last-symbol-blank downlink subframe. The downlink special subframe may be classified as a complete downlink special subframe and a last-symbol-blank downlink special subframe.

In an embodiment, the user equipment can detect whether the previous subframe is a downlink subframe through downlink control information (e.g., downlink control information of the common downlink). In addition, the user equipment can further detect, by using the downlink control information, that the previous subframe is which one of the complete downlink subframe, the complete downlink special subframe, the last-symbol-blank downlink subframe, and the last-symbol-blank special subframe.

In addition, if the previous subframe is detected to be the uplink subframe, in the case where the user equipment is scheduled in the previous UL subframe, the user equipment can detect the structure of the previous subframe.

More specifically, when the user equipment is scheduled by a different uplink grant in the previous uplink subframe, the user equipment can determine that the previous uplink subframe is a complete uplink subframe or a last-symbol-blank uplink subframe based on the indication in the downlink control information of the uplink.

On the other hand, in a first example, when the user equipment is not scheduled in the previous subframe, for example, when other user equipment is scheduled in the previous subframe, the user equipment cannot know the structure of the previous sub-frame. In this case, in order to avoid ambiguity between the user equipment and the base station, the previous subframe is determined as a complete uplink subframe in the embodiment of the present disclosure.

In a second example, when the previous subframe is a blank subframe, likewise, in order to avoid ambiguity, the previous subframe is determined as a complete uplink subframe in the embodiment of the present disclosure.

In a third example, in the case of multi-subframe scheduling, when the user equipment is scheduled by the same uplink grant at the downlink control information (e.g., downlink control information 0B/4B format) in the previous subframe, likewise, in order to avoid ambiguity, the previous subframe is determined as a complete uplink subframe in the embodiment of the present disclosure.

It should be noted that the above description is only an example. A person skilled in the art can appropriately combine the above examples according to design needs.

In addition, it should be noted that a person skilled in the art can perform other designs on this basis to determine the structure of the previous subframe of the current subframe, as long as the same understanding exists between the user equipment and the base station.

Thereafter, in step S230, the start transmission timing of the current subframe is determined from four timings different from one another, based on the indication information, the LBT type, and the structure of the previous subframe.

Specifically, the indication information indicates, for example, a starting OFDM symbol. More specifically, the indication information may, for example, indicate a starting PUSCH DFT-S-OFDM symbol. The LBT type may be, for example, one of a second type LBT and a fourth type LBT. The second type of LBT refers, for example, to the LBT type of 25 µs Listen. The fourth type LBT refers, for example, to an LBT type based on random backoff of a contention window with a variable size. The four timings different from one another may be, for example, a 0th symbol, a timing at which a predetermined value elapses after the 0th symbol, a timing at which the predetermined value and a TA value elapse after the 0th symbol, and a 1st symbol. The predetermined value is, for example, 25 µs or the like. Furthermore, the indication information may be, for example, one-bit information or at-least-two-bit information.

In the first case, the indication information contains one-bit information. Specifically, in an example, the indication information is applied to the case of single subframe scheduling, and is used to represent one of the 1st symbol and the 0th symbol. In another example, the indication information is applied to the case of multi-subframe scheduling, and is used to represent one of the 1st symbol and the non-1st symbol. In yet another example, the indication information is applied to the case of multi-subframe scheduling, and is used to represent one of the 0th symbol and the non-0th symbol. In the following, determination of the start transmission timing in various examples will be described separately.

First, the case of single subframe scheduling is described. In this case, as described above, the indication information is used, for example, to indicate one of the 1st symbol and the 0th symbol. Thus, in order to determine the start transmission timing of the current subframe from four timings different from one another, the user equipment needs to jointly interpret the indication information, the LBT type, and the structure of the previous subframe.

More specifically, referring to the following Table 1, when the indication information indicates the 1st symbol, it can be determined that the start transmission timing is the 1st symbol. When the indication information indicates the 0th symbol, the LBT type is the second type LBT, and the structure of the previous subframe is the complete uplink subframe or the complete downlink special subframe, it can be determined that the start transmission timing is a timing at which a predetermined value elapses after the 0th symbol. When the indication information indicates the 0th symbol, the LBT type is the second type LBT, and the structure of the previous subframe is the complete downlink subframe, the start transmission timing can be determined to be a timing at which the predetermined value and a TA value elapse after the 0th symbol. In addition, when the indication information indicates the 0th symbol, and the structure of the previous subframe is the last-symbol-blank uplink subframe, the last-symbol-blank downlink special subframe, or the last-symbol-blank downlink of subframe, it can be determined that the start transmission timing is the 0th symbol.

TABLE 1

Start transmission timing in the case of single subframe scheduling according to the first embodiment

| Indication information | LBT type | Structure of the previous subframe | Start transmission timing |
|---|---|---|---|
| 1st symbol | — | — | 1st symbol |
| 0th symbol | Second type | Complete uplink subframe or complete downlink special subframe | A timing at which a predetermined value elapses after the 0th symbol |
| 0th symbol | Second type | Complete downlink subframe | A timing at which the predetermined value and a TA value elapse after the 0th symbol |
| 0th symbol | — | Last-symbol-blank uplink subframe, last-symbol-blank downlink special subframe, or last-symbol-blank downlink subframe | 0th symbol |

It should be noted that in Table 1 shown above, the mark "-" indicates that the item is not considered. For example, the first row of Table 1 indicates that when the indication information is "1st symbol", the start transmission timing is determined as "1st symbol" regardless of the LBT type and the structure of the previous subframe. This also applies to the tables provided below.

Specifically, FIGS. 3A to 3H show the start transmission timings in respective cases. In FIGS. 3A-3H, a box filled with slash shades indicates an uplink subframe, and a box filled with vertical line shades indicates a downlink subframe.

Figure 3A:
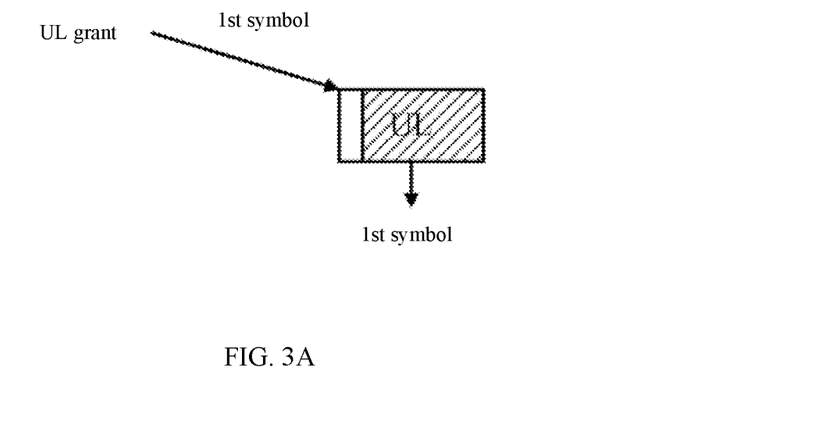
FIGS. 3A to 3H are schematic diagrams illustrating a subframe to which a method for determining a start transmission timing of a subframe is applied according to the first embodiment of the present disclosure.

As shown in FIG. 3A, when the indication information indicates the 1st symbol, it can be determined that the start transmission timing is the 1st symbol.

Figure 3B:
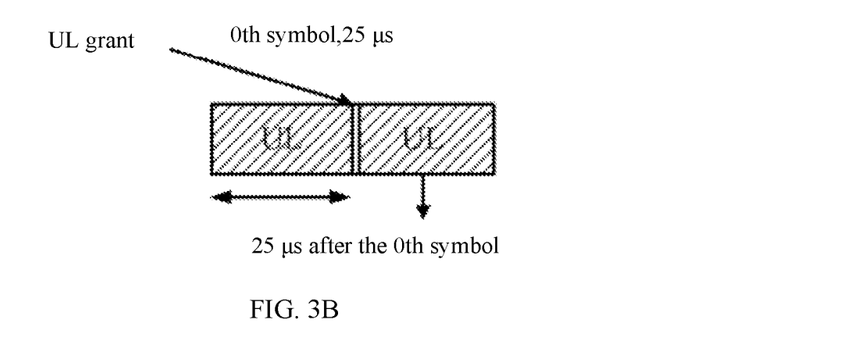
Figure 3C:
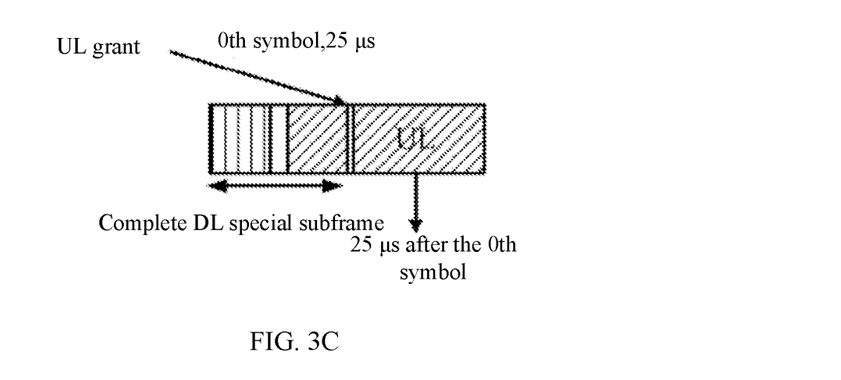

As shown in FIG. 3B and FIG. 3C respectively, when the indication information indicates the 0th symbol, the LBT type is the second type LBT (i.e., based on 25 μs), and the structure of the previous subframe is the complete uplink (UL) subframe or the complete downlink (DL) special subframe, it can be determined that the start transmission timing is a timing at which a predetermined value elapses after the 0th symbol.

Figure 3D:
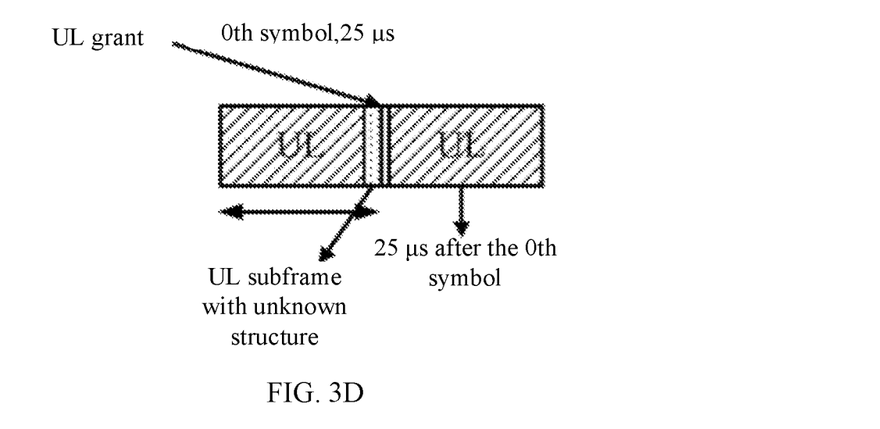

As shown in FIG. 3D, in the case where the user equipment cannot determine the structure of the previous subframe due to the fact that the user equipment is not scheduled in the previous subframe or the previous subframe is a blank subframe etc., as described above, the user equipment determines the previous subframe in default as a complete uplink subframe, thus, when the indication information indicates the 0th symbol and the LBT type is the second type LBT, the start transmission timing can be determined as a timing at which a predetermined value elapse after the 0th symbol.

Figure 3E:
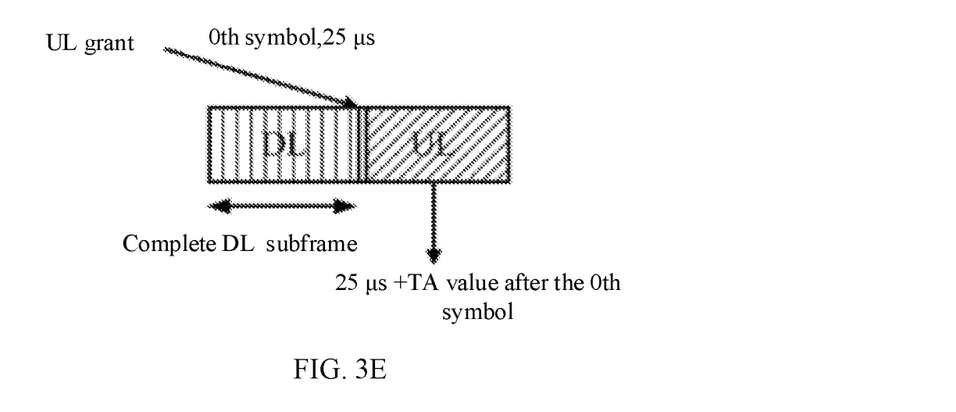

As shown in FIG. 3E, when the indication information indicates the 0th symbol, the LBT type is the second type LBT, and the structure of the previous subframe is the complete downlink subframe, it can be determined that the start transmission timing is a timing at which the predetermined value and a TA value elapse after the 0th symbol.

Figure 3F:
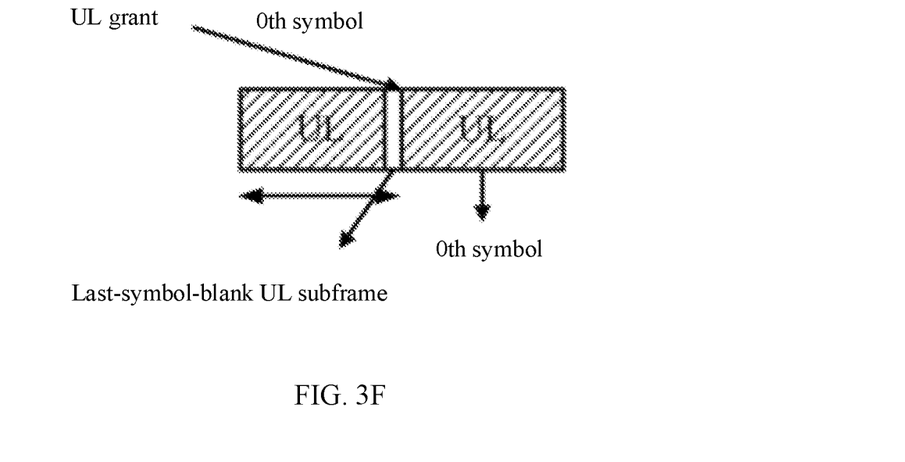
Figure 3G:
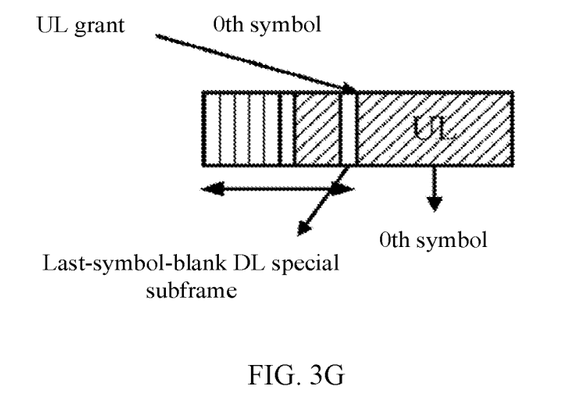
Figure 3H:
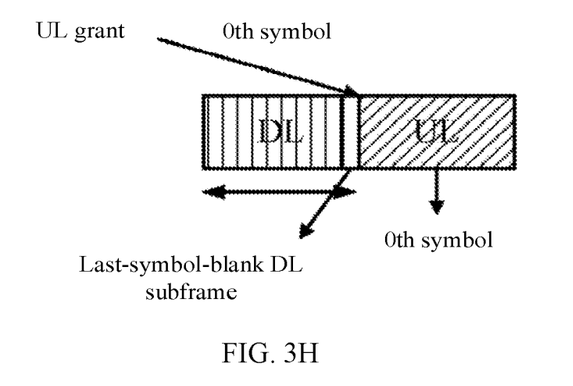

In addition, as shown in FIG. 3F to FIG. 3H respectively, when the indication information indicates the 0th symbol, and the structure of the previous subframe is the last-symbol-blank uplink subframe (FIG. 3F), the last-symbol-blank downlink special subframe (FIG. 3G) or the last-symbol-blank downlink subframe (FIG. 3H), it can be determined that the start transmission timing is the 0th symbol.

Next, the case of multi-subframe scheduling will be described. In a first example of multi-subframe scheduling, the indication information may be used to represent one of the 1st symbol and the non-1st symbol.

Accordingly, in order to determine the start transmission timing of the current subframe from four timings different from one another, the user equipment needs to jointly interpret the indication information, the LBT type, and the structure of the previous subframe.

More specifically, referring to the following Table 2, when the indication information indicates the 1st symbol, it can be determined that the start transmission timing is the 1st symbol. When the indication information indicates the non-1st symbol, the LBT type is the second type LBT, and the structure of the previous subframe is the complete uplink subframe or the complete downlink special subframe, it can be determined that the start transmission timing is a timing at which a predetermined value elapses after the 0th symbol. When the indication information indicates the non-1st symbol, the LBT type is the second type LBT, and the structure of the previous subframe is the complete downlink subframe, the start transmission timing can be determined to be a timing at which the predetermined value and a TA value elapse after the 0th symbol. In addition, when the indication information indicates the non-1st symbol, and the structure of the previous subframe is the last-symbol-blank uplink subframe, the last-symbol-blank downlink special subframe, or the last-symbol-blank downlink subframe, it can be determined that the start transmission timing is the 0th symbol.

TABLE 2

First example of start transmission timing in the case of multi-subframe scheduling according to the first embodiment

| Indication information | LBT type | Structure of the previous subframe | Start transmission timing |
|---|---|---|---|
| 1st symbol | — | — | 1st symbol |
| Non-1st symbol | Second type | Complete uplink subframe or complete downlink special subframe | A timing at which a predetermined value elapses after the 0th symbol |
| Non-1st symbol | Second type | Complete downlink subframe | A timing at which the predetermined value and a TA value elapse after the 0th symbol |
| Non-1st symbol | — | The last-symbol-blank uplink subframe, the last-symbol-blank downlink special subframe, or the last-symbol-blank, downlink subframe | 0th symbol |

In the second example of multi-subframe scheduling, the indication information may be used to represent one of the 0th symbol and the non-0th symbol.

Accordingly, in order to determine the start transmission timing of the current subframe from the four timings different from one another, the user equipment needs to jointly interpret the indication information, the LBT type, and the structure of the previous subframe.

More specifically, referring to Table 3 below, when the indication information indicates the 0th symbol, it is determined that the start transmission timing is the 0th symbol. When the indication information indicates the non-0th symbol, the LBT type is the second type LBT, and the structure of the previous subframe is the complete uplink subframe or the complete downlink special subframe, it is determined that start transmission timing is a timing at which a predetermined value elapses after the 0th symbol. When the indication information indicates the non-0th symbol, the LBT type is the second type LBT, and the structure of the previous subframe is the complete downlink subframe, it is determined that the start transmission timing is a timing at which the predetermined value and a timing advance value elapse after the 0th symbol. When the indication information indicates the non-0th symbol and the LBT type is the fourth type LBT, it is determined that the start transmission timing is the 1st symbol.

TABLE 3

Second example of start transmission timing in the case of multi-subframe scheduling according to the first embodiment

| Indication information | LBT type | Structure of the previous subframe | Start transmission timing |
|---|---|---|---|
| 0th symbol | — | — | 0th symbol |
| Non-0th symbol | Second type | Complete uplink subframe or complete downlink special subframe | A timing at which a predetermined value elapses after the 0th symbol |
| Non-0th symbol | Second type | Complete downlink subframe | A timing at which the predetermined value and a TA value elapse after the 0th symbol |
| Non-0th symbol | Fourth type | — | 1st symbol |

The case where the indication information is one-bit information has been described above with reference to Tables 1 to 3. Next, the case where the indication information is at-least-two-bit information will be described.

In this case, for single-subframe scheduling, since the indication information contains two bits, it can indicate four types of timings (e.g., 00 indicates that the start transmission timing is a 0th symbol, 01 indicates that the start transmission timing is a timing at which a predetermined value elapses after the 0th symbol, 10 indicates that the start transmission timing is a timing at which the predetermined value and a TA value elapse after the 0th symbol, and 11 indicates that the start transmission timing is a 1st symbol), thus, the start transmission timing of the PUSCH transmission can be determined by the indication information itself. For multi-subframe scheduling, in the case of adopting to indicate a first scheduled subframe among a plurality of scheduled subframes, likewise, the start transmission timing of the PUSCH transmission can be determined by the indication information itself. However, for multi-subframe scheduling, even if there is the two-bit indication information as mentioned above, in the case of adopting to indicate one or more options of a plurality of scheduled subframes, regardless of the sub-option adopting the 2-bit joint indication, the sub-option adopting the bitmap, or the sub-option adopting the (1+x)-bit indication, for one or more scheduled sub-frames, there is still a problem that the four timings cannot be completely distinguished. At this time, a person skilled in the art can understand that the start transmission timing of the PUSCH transmission can also be determined by Table 2 and Table 3 as described above.

The method for determining a start transmission timing of a subframe for a physical uplink shared channel according to the first embodiment of the present disclosure has been described above with reference to FIGS. 2 and 3.

Next, a user equipment according to the first embodiment of the present disclosure will be described with reference to FIG. 4, the user equipment can execute the method for determining a start transmission timing of a subframe for a physical uplink shared channel described above with reference to FIGS. 2 and 3.

Figure 4:
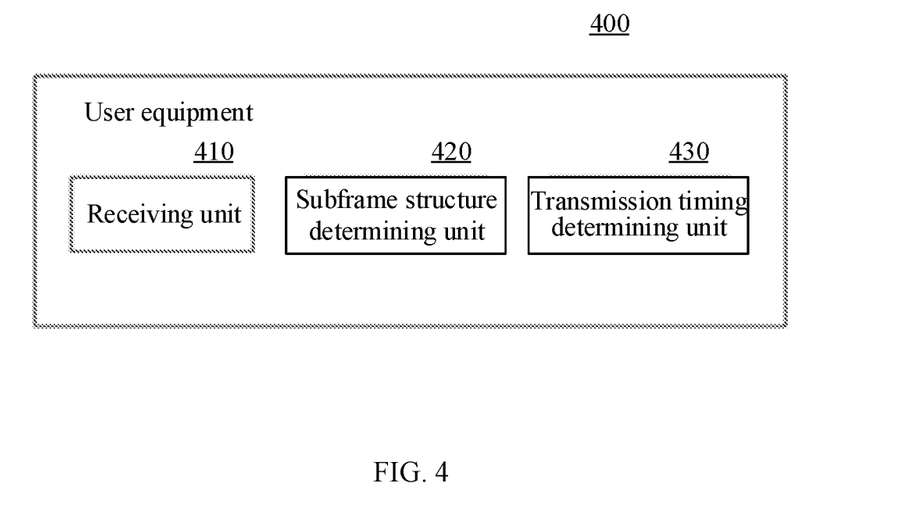
FIG. 4 is a block diagram illustrating main configuration of a user equipment according to the first embodiment of the present disclosure.

As shown in FIG. 4, the user equipment 400 comprises a receiving unit 410, a subframe structure determining unit 420 and a transmission timing determining unit 430. It should be noted that FIG. 4 shows only elements in the user equipment 400 that are closely related to embodiment of the present disclosure, and this is merely illustrative, and the user equipment 400 may comprise other elements as needed.

The receiving unit 410 is configured to receive downlink control information from a base station, the downlink control information includes indication information of the start transmission timing and a listen-before-talk LBT type.

The subframe structure determining unit 420 is configured to determine a structure of a previous subframe of a current subframe.

The transmission timing determining unit 430 is configured to determine, from four timings different from one another, the start transmission timing of the current subframe based on the indication information, the LBT type, and the structure of the previous subframe.

Specifically, in an embodiment, the subframe structure determining unit 420 is configured to: when the user equipment is not scheduled in the previous subframe, or when the previous subframe is a blank subframe, or when the user equipment is scheduled through the same uplink grant in the previous subframe, determine the previous subframe as the complete uplink subframe.

In another embodiment, the indication information is used to indicate one of a 1st symbol and a 0th symbol; or the indication information is used to indicate one of a 1st symbol and a non-1st symbol; or the indication information is used to indicate one of a 0th symbol and a non-0th symbol.

In another embodiment, the indication information is used to indicate one of a 1st symbol and a 0th symbol; or the indication information is used to indicate one of a 1st symbol and a non-1st symbol; the LBT type is one of a second type LBT and a fourth type LBT; the structure of the previous subframe is one of a complete uplink subframe, a complete downlink special subframe, a complete downlink subframe, a last-symbol-blank uplink subframe, a last-symbol-blank downlink special subframe, and a last-symbol-blank downlink subframe; the transmission timing determining unit 430 is configured to: when the indication information indicates the 1st symbol, determine that the start transmission timing is the 1st symbol; when the indication information indicates the 0th symbol or the non-1st symbol, the LBT type is the second type LBT, and the structure of the previous subframe is the complete uplink subframe or the complete downlink special subframe, determine that the start transmission timing is a timing at which a predetermined value elapses after the 0th symbol; when the indication information indicates the 0th symbol or the non-1st symbol, the LBT type is the second type LBT, and the structure of the previous subframe is the complete downlink subframe, determine that the start transmission timing is a timing at which the predetermined value and a timing advance value elapse after the 0th symbol; when the indication information indicates the 0th symbol or the non-1st symbol, and the structure of the previous subframe is the last-symbol-blank uplink subframe or the last-symbol-blank downlink special subframe or the last-symbol-blank downlink subframe, determine that the start transmission timing is the 0th symbol.

In another embodiment, the indication information is used to indicate one of a 0th symbol and a non-0th symbol; the LBT type is one of a second type LBT and a fourth type LBT; the structure of the previous subframe is one of a complete uplink subframe, a complete downlink special subframe, a complete downlink subframe, a last-symbol-blank uplink subframe, a last-symbol-blank downlink special subframe, and a last-symbol-blank downlink subframe; the transmission timing determining unit 430 is configured to: when the indication information indicates the 0th symbol, determine that the start transmission timing is the 0th symbol; when the indication information indicates the non-0th symbol, the LBT type is the second type LBT, and the structure of the previous subframe is the complete uplink subframe or the complete downlink special subframe, determine that the start transmission timing is a timing at which a predetermined value elapses after the 0th symbol; when the indication information indicates the non-0th symbol, the LBT type is the second type LBT, and the structure of the previous subframe is the complete downlink subframe, determine that the start transmission timing is a timing at which the predetermined value and a timing advance value elapse after the 0th symbol; when the indication information indicates the non-0th symbol and the LBT type is the fourth type LBT, determine that the start transmission timing is the 1st symbol.

Configuration and operation of the various units of the user equipment according to the first embodiment of the present disclosure have been described in detail in the method described with reference to FIGS. 2 and 3, and details will not be repeated herein.

Further, although not shown herein, a person skilled in the art can understand that, corresponding to the method for determining the start transmission timing for the PUSCH subframe in the user equipment according to the first embodiment of the present disclosure, the method for indicating a start transmission timing for a PUSCH subframe in a base station in the first embodiment according to the present disclosure may comprise: generating downlink control information, the downlink control information including indication information of the start transmission timing and a listen-before-talk LBT type; and sending the downlink control information to a user equipment; wherein the indication information and the LBT type are used for determining, by the user equipment, from four timings different from one another, the start transmission timing of the current subframe, in conjunction with the structure of the previous subframe of the current subframe determined by the user equipment.

Further, although not shown herein, a person skilled in the art can understand that, corresponding to the user equipment according to the first embodiment of the present disclosure, the base station in the first embodiment according to the present disclosure may comprise: a generating unit, configured to generate downlink control information, the downlink control information including indication information of the start transmission timing and a listen-before-talk LBT type; and a sending unit, configured to send the downlink control information to a user equipment; wherein the indication information and the LBT type are used for determining, by the user equipment, from four timings different from one another, the start transmission timing of the current subframe, in conjunction with the structure of the previous subframe of the current subframe determined by the user equipment.

In addition, it should be noted that correspondence relationship between the indication information, the LBT type, the structure of the previous subframe and the start transmission timing described above with reference to Table 1 to Table 3 may be pre-stored in the user equipment and the base station in various forms such as a table. For example, it may be placed in the user equipment and the base station in a manner such as hard coding. Alternatively, the correspondence relationship may also be communicated between the user equipment and the base station in a manner such as higher layer signaling during operation. Thus, there is no ambiguity in understanding between the user equipment and the base station.

The method for determining and indicating the start transmission timing of the subframe, the user equipment, and the base station according to the first embodiment of the present disclosure have been described above with reference to FIGS. 2 to 4.

In the method for determining and indicating the start transmission timing of the subframe, the user equipment, and the base station according to the first embodiment of the present disclosure, the start transmission timing of the current subframe for PUSCH transmission can be determined by using the indication information, the LBT type, and the structure of the previous subframe. Thus, even if the indication information alone cannot indicate various available timings, it can be jointly interpreted with the LBT type and the structure of the previous subframe, so as to determine the start transmission timing of the current subframe from more than two (e.g., four) transmission timings.

Furthermore, even if the indication information can indicate various available timings in the case of single subframe scheduling, it may not be possible to distinguish at least a plurality of available timings in the case of multi-subframe scheduling. By adopting the method for determining and indicating the start transmission timing of the subframe, the indication information can be jointly explained with the LBT type and the structure of the previous subframe, so that multiple types of available timings that cannot be distinguished in the case of multi-subframe scheduling are distinguished.

Hereinafter, a method for determining and indicating a start transmission timing of a subframe, a user equipment, and a base station according to a second embodiment of the present disclosure will be described with reference to FIGS. 5 to 8, which are also applicable to the system shown in FIG. 1.

First, a method for determining a start transmission timing of a subframe for a physical uplink shared channel in a user equipment will be described with reference to FIG. 5.

Figure 5:
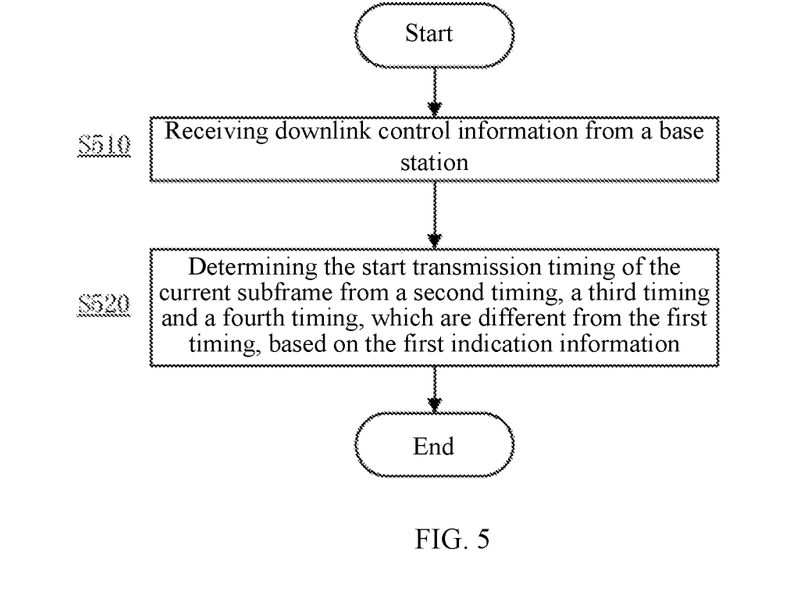
FIG. 5 is a flowchart illustrating main steps of a method for determining a start transmission timing of a subframe according to a second embodiment of the present disclosure.

As shown in FIG. 5, first, in step S510, downlink control information is received from a base station. Specifically, the downlink control information includes first indication information used for a start transmission timing. More specifically, the first indication information includes at least two bits. In other words, the first indication information can indicate at least four transmission timings that are different from one another.

Next, in step S520, in a case where multi-subframe scheduling is performed and the downlink control information further includes second indication information used for a start transmission timing, when the second indication information indicates that a start transmission timing of the current subframe is not a first timing, the start transmission timing of the current subframe is determined from a second timing, a third timing and a fourth timing different from the first timing and based on the first indication information.

Specifically, in the case of multi-subframe scheduling, as described above, there are a first option that the start transmission timing is applicable only to a first scheduled subframe of a plurality of scheduled subframes, and a second option that the start transmission timing is applicable to one or more scheduled subframe of a plurality of scheduled subframes. The process of step S520 is, for example, directed to the second option as described above. That is, the processing of step S520 is applicable to, for example, the case of the first sub-option adopting the 2-bit joint indication, the second sub-option adopting the bitmap, or the third sub-option adopting the (1+x)-bit indication. In the case of any of the sub-options described above, in addition to the first indication information of at least two bits described above, the downlink control information further includes second indication information for the start transmission timing. For example, in the case of the first sub-option, the second indication information may refer to 2 bits for jointly indicating four states that start in the 1st symbol {none, all, only in 1st subframe, in 1st subframe and 3rd subframe}. In the case of the second sub-option, the second indication information may refer to the bitmap information. In the case of the third sub-option, the second indication information may refer to the (1+x)-bit information.

Further, in a first example, the four timings may be classified based on whether or not it is the 1st symbol. Specifically, the first timing may be a 1st symbol, and the second timing, the third timing, and the fourth timing each may be one of a 0th symbol, a timing at which a predetermined value elapses after the 0th symbol, and a timing at which the predetermined value and a timing advance value elapse after the 0th symbol. The predetermined value may be, for example, 25 µs.

Thus, in the processing of step S520, in the first example, when the second indication information indicates that the start transmission timing of the current subframe is not the 1st symbol, the start transmission timing of the current subframe can be determined based on the first indication information, from the 0th symbol, the timing at which a predetermined value elapses after the 0th symbol, and the timing at which the predetermined value and a timing advance value elapse after the 0th symbol.

In a second example, four timings can be classified based on whether there is a gap. Specifically, the first timing may be a 0st symbol (that is, no gap), and the second timing, the third timing, and the fourth timing each may be one of a lth symbol, a timing at which a predetermined value elapses after the 0th symbol, and a timing at which the predetermined value and a timing advance value elapse after the 0th symbol. The predetermined value may be, for example, 25 µs. Thus, when the second indication information indicates that the start transmission timing of the current subframe is not the 0th symbol, the start transmission timing of the current subframe can be determined based on the first indication information, the 0th symbol, the timing at which the predetermined value elapses after the 0th symbol, and the timing at which the predetermined value and a timing advance value elapse after the 0th symbol.

For example, the start transmission timing can be determined based on Table 4 shown below, wherein in the above-described first example, three columns of "00", "01", and "10" in Table 4 are applicable; in the above second example, three columns "01", "10", and "11" in Table 4 are applicable.

TABLE 4

Example of start transmission timing in the case of multi-subframe scheduling according to the second embodiment

| First indication information | Start transmission timing |
| --- | --- |
| 00 | 0th symbol |
| 01 | A timing at which a predetermined value elapses after the 0th symbol |
| 10 | A timing at which the predetermined value and a TA value elapse after the 0th symbol |
| 11 | 1st symbol |

It should be noted that the correspondence relationship between the bit value of the first indication information and the start transmission timing shown in Table 4 above is only an example. A person skilled in the art can arbitrarily set the correspondence relationship as needed, as long as at least three different start transmission timings can be distinguished by the first indication information.

Furthermore, it should be noted that the above shows the operation in the case of multi-subframe scheduling to which the second option is applied. A person skilled in the art can understand that, in the case of single subframe scheduling or in the case of multi-subframe scheduling to which the first option is applied, four different start transmission timings can be indicated by another two separate bits. Alternatively, four different start transmission timings may be jointly indicated by multiplexing one bit in the first indication information and another separate one bit. Alternatively, four different start transmission timings may be indicated by multiplexing the total two bits of the first indication information.

In addition, it should be noted that correspondence relationship between the first indication information and the start transmission timing described above with reference to Table 4 may be pre-stored in the user equipment and the base station in various forms such as a table. For example, it may be placed in the user equipment and the base station in a manner such as hard coding. Alternatively, the correspondence relationship may also be communicated between the user equipment and the base station in a manner such as higher layer signaling during operation. Thus, there is no ambiguity in understanding between the user equipment and the base station.

Next, a user equipment according to the first embodiment of the present disclosure will be described with reference to FIG. 6, the user equipment can execute the method for determining a start transmission timing of a subframe for a physical uplink shared channel described above with reference to FIG. 5.

Figure 6:
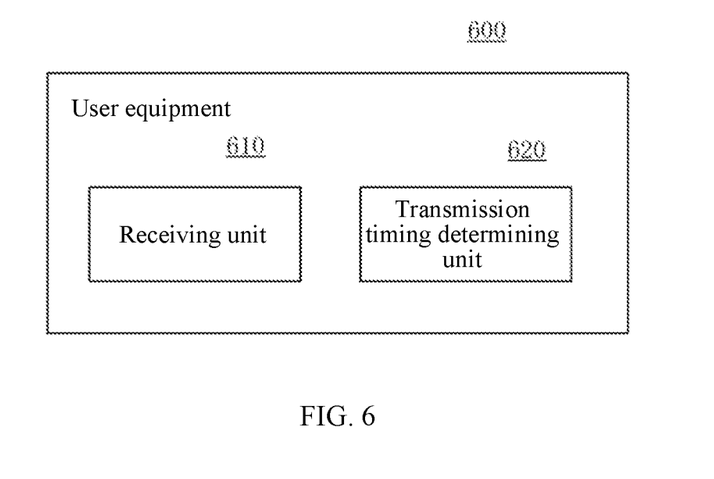
FIG. 6 is a block diagram illustrating main configuration of a user equipment according to the second embodiment of the present disclosure.

As shown in FIG. 6, the user equipment 600 comprises a receiving unit 610 and a transmission timing determining unit 620. It should be noted that FIG. 6 shows only elements in the user equipment 600 that are closely related to the second embodiment of the present disclosure, and this is merely illustrative, and the user equipment 600 may comprise other elements as needed.

The receiving unit 610 is configured to receive downlink control information from a base station, the downlink control information including first indication information used for a start transmission timing, the first indication information including at least two bits.

The transmission timing determining unit 620 is configured to, in a case where multi-subframe scheduling is performed and the downlink control information further includes second indication information used for a start transmission timing, when the second indication information indicates that a start transmission timing of the current subframe is not a first timing, determine the start transmission timing of the current subframe from a second timing, a third timing and a fourth timing, which are different from the first timing, based on the first indication information.

In an embodiment, the first timing is a 1st symbol, the second timing, the third timing and the fourth timing each are one of a 0th symbol, a timing at which a predetermined value elapses after the 0th symbol, and a timing at which the predetermined value and a timing advance value elapse after the 0th symbol; or the first timing is a 0th symbol, the second timing, the third timing and the fourth timing each are one of a lth symbol, a timing at which a predetermined value elapses after the 0th symbol, and a timing at which the predetermined value and a timing advance value elapse after the 0th symbol.

Configuration and operation of the various units of the user equipment 600 have been described in detail in the method described with reference to FIG. 5, and details will not be repeated herein.

Next, a method for indicating a start transmission timing of a subframe for a physical uplink shared channel in a base station will be described with reference to FIG. 7.

Figure 7:
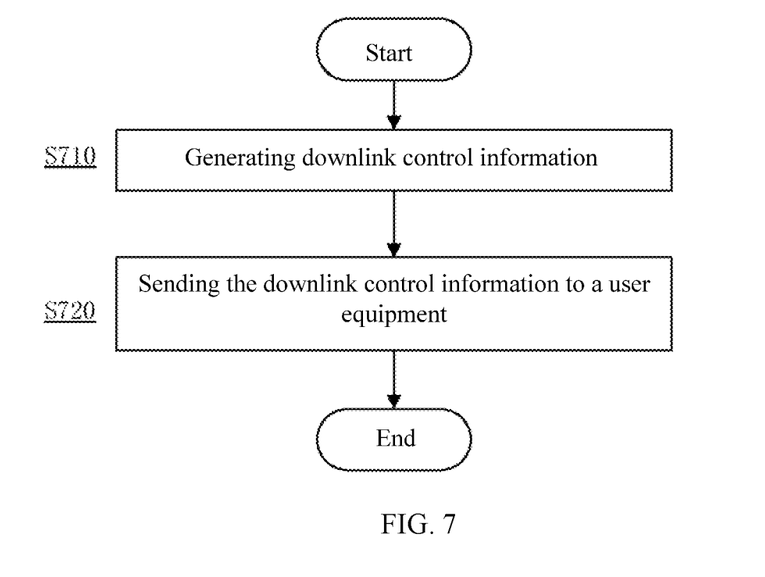
FIG. 7 is a flowchart illustrating main steps of a method for indicating a start transmission timing of a subframe according to the second embodiment of the present disclosure.

As shown in FIG. 7, first, in step S710, downlink control information is generated. Specifically, the downlink control information includes first indication information used for a start transmission timing, the first indication information includes at least two bits.

More specifically, in a case where the first indication information can be used for performing multi-subframe scheduling and the downlink control information further includes second indication information used for a start transmission timing, when the second indication information indicates that the start transmission timing of the current subframe of the user equipment is not a first timing, the start transmission timing of the current subframe is indicated from a second timing, a third timing and a fourth timing different from the first timing.

In addition, in a case where the first indication information may be used for performing single subframe scheduling, or in a case where multi-subframe scheduling is performed and the downlink control information does not include the second indication information, the start transmission timing of the current subframe is indicated from the first timing, the second timing, the third timing and the fourth timing. Meaning, structure and function of the first indication information have been described in detail in the method described above with reference to of FIG. 5, and details will not be repeated herein.

Next, in step S720, the downlink control information is sent to the user equipment.

The method for indicating a start transmission timing of a subframe for a physical uplink shared channel in a base station has been described above with reference to FIG. 7.

Next, a base station according to the second embodiment of the present disclosure will be described with reference to FIG. 8. The base station according to the second embodiment of the present disclosure is also applicable to the system as shown in FIG. 1, the base station can perform the method for indicating a start transmission timing of a subframe for a physical uplink shared channel in a base station described above with reference to FIG. 7.

Figure 8:
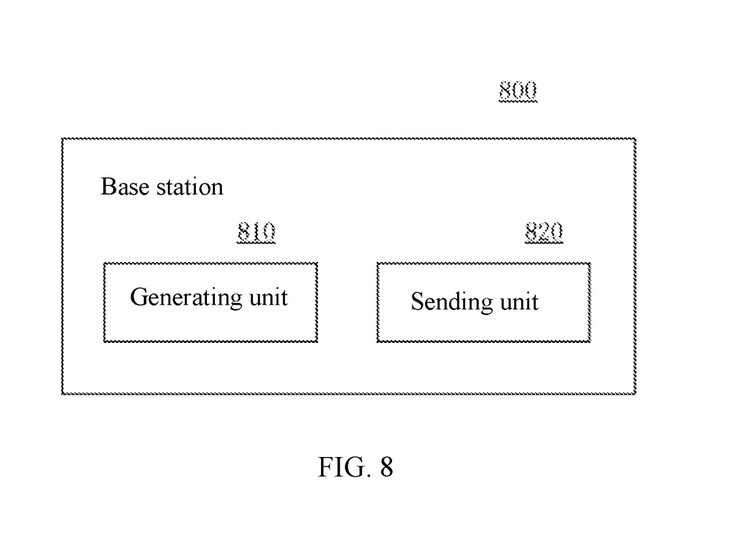
FIG. 8 is a block diagram illustrating main configuration of a base station according to the second embodiment of the present disclosure.

As shown in FIG. 8, the base station 800 comprises a generating unit 810 and a sending unit 820. It should be noted that FIG. 8 shows only elements of the base station 800 that are closely related to embodiment of the present disclosure, and this is merely illustrative, and the base station 800 may comprise other elements as needed.

The generating unit 810 is configured to generate downlink control information. The downlink control information includes first indication information used for a start transmission timing. The first indication information including at least two bits.

The sending unit 820 is configured to send the downlink control information to a user equipment.

In a case where the first indication information can be used for performing multi-subframe scheduling and the downlink control information further includes second indication information used for a start transmission timing, when the second indication information indicates that the start transmission timing of the current subframe of the user equipment is not a first timing, the start transmission timing of the current subframe is indicated from a second timing, a third timing and a fourth timing, which are different from the first timing.

In addition, in a case where the first indication information can be used for performing single subframe scheduling, or in a case where multi-subframe scheduling is performed and the downlink control information does not include the second indication information, the start transmission timing of the current subframe is indicated from the first timing, the second timing, the third timing and the fourth timing.

Configuration and operation of the various units of the base station 800 have been described in detail in the method described with reference to FIG. 7, and no details will be repeated herein.

In the method for determining and indicating a start transmission timing of a subframe, the user equipment, and the base station according to the second embodiment of the present disclosure, by using the indication information of at least two bits, the start transmission timing of the current subframe for PUSCH transmission can be indicated or determined. Thereby, it is possible to distinguish at least three available timings that cannot be distinguished in the case of multi-subframe scheduling.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

In addition, in this specification, the expressions like "first", "second", etc. are used for convenience of description only, and do not mean that the defined unit must be implemented as a plurality of separate units, It does not mean that there are prioritized steps in the defined steps, and so on Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and disclosures. To sum up, contents of this specification should not be construed as limiting the present disclosure.

The invention claimed is:

1. A user equipment comprising:
a processor;
a storage medium having computer program instructions stored thereon, wherein the computer program instructions, when executed by the processor, perform processing of:
receiving downlink control information from a base station, the downlink control information including indication information on a start transmission timing of a current subframe for a physical uplink shared channel and a listen-before-talk LBT type;
determining a structure of a previous subframe of a current subframe, the structure of the previous subframe being one of a complete uplink subframe, a complete downlink special subframe, a complete downlink subframe, a last-symbol-blank uplink subframe, a last-symbol-blank downlink special subframe, and a last-symbol-blank downlink subframe, wherein the determining a structure of a previous subframe of a current subframe including:
detect whether the previous subframe is a downlink subframe or an uplink subframe;
upon the previous subframe being a downlink subframe, determining that the previous subframe is one of the complete downlink subframe, the complete downlink special subframe, the last-symbol-blank downlink subframe, and the last-symbol-blank special subframe according to downlink control information, and upon the previous subframe being a uplink subframe, determining that the previous uplink subframe is the complete uplink subframe or the last-symbol-blank uplink subframe according to downlink control information; and
determining one timing from a plurality of timings as the start transmission timing of the current subframe according to the listen-before-talk type, the determined structure of the previous subframe and a correspondence among the listen-before-talk type, structures of previous subframes and the plurality of timings, when the indication information indicates that the start transmission timing of the current subframe is not a first timing,
wherein the plurality of timings includes a second timing, a third timing and a fourth timing.

2. The user equipment of claim 1, wherein
the indication information is used to indicate one of a 1st symbol and a 0th symbol; or
the indication information is used to indicate one of a 1st symbol and a non-1st symbol; or
the indication information is used to indicate one of a 0th symbol and a non-0th symbol.

3. The user equipment of claim 2, wherein
the indication information is used to indicate one of a 1st symbol and a 0th symbol; or the indication information is used to indicate one of a 1st symbol and a non-1st symbol;
the LBT type is one of a second type LBT and a fourth type LBT;
the processor is configured to:
when the indication information indicates the 1st symbol, determine that the start transmission timing is the 1st symbol;
when the indication information indicates the 0th symbol or the non-1st symbol, the LBT type is the second type LBT, and the structure of the previous subframe is the complete uplink subframe or the complete downlink special subframe, determine that the start transmission timing is a timing at which a predetermined value elapses after the 0th symbol;
when the indication information indicates the 0th symbol or the non-1st symbol, the LBT type is the second type LBT, and the structure of the previous subframe is the complete downlink subframe, determine that the start transmission timing is a timing at which the predetermined value and a timing advance value elapse after the 0th symbol; and
when the indication information indicates the 0th symbol or the non-1 st symbol, and the structure of the previous subframe is the last-symbol-blank uplink subframe or the last-symbol-blank downlink special subframe or the last-symbol-blank downlink subframe, determine that the start transmission timing is the 0th symbol.

4. The user equipment of claim 2, wherein the indication information is used to indicate one of the 0th symbol and the non-0th symbol;
the LBT type is one of a second type LBT and a fourth type LBT;
the processor is configured to:
when the indication information indicates the 0th symbol, determine that the start transmission timing is the 0th symbol;
when the indication information indicates the non-0th symbol, the LBT type is the second type LBT, and the structure of the previous subframe is the complete uplink subframe or the complete downlink special subframe, determine that the start transmission timing is a timing at which a predetermined value elapses after the 0th symbol;
when the indication information indicates the non-0th symbol, the LBT type is the second type LBT, and the structure of the previous subframe is the complete downlink subframe, determine that the start transmission timing is a timing at which the predetermined value and a timing advance value elapse after the 0th symbol; and
when the indication information indicates the non-0th symbol and the LBT type is the fourth type LBT, determine that the start transmission timing is the 1st symbol.

5. A method performed by a user equipment, comprising:
receiving downlink control information from a base station, the downlink control information including indication information on a start transmission timing of a current subframe for a physical uplink shared channel and a listen-before-talk LBT type;
determining structure of a previous subframe of a current subframe, the structure of the previous subframe being one of a complete uplink subframe, a complete downlink special subframe, a complete downlink subframe, a last-symbol-blank uplink subframe, a last-symbol-blank downlink special subframe, and a last-symbol-blank downlink subframe, wherein the determining a structure of a previous subframe of a current subframe including:
detect whether the previous subframe is a downlink subframe or an uplink subframe;
upon the previous subframe being a downlink subframe, determining that the previous subframe is one of the complete downlink subframe, the complete downlink special subframe, the last-symbol-blank downlink subframe, and the last-symbol-blank special subframe according to downlink control information, and upon the previous subframe being a uplink subframe, determining that the previous uplink subframe is the complete uplink subframe or the last-symbol-blank uplink subframe according to downlink control information; and
determining one timing from a plurality of timings as the start transmission timing of the current subframe according to the listen-before-talk type, the determined structure of the previous subframe and a correspondence among the listen-before-talk type, structures of previous subframes and the plurality of timings, when the indication information indicates that the start transmission timing of the current subframe is not a first timing,
wherein the plurality of timings includes a second timing, a third timing and a fourth timing.

6. The method of claim 5, wherein
the indication information is used to indicate one of a 1st symbol and a 0th symbol; or
the indication information is used to indicate one of a 1st symbol and a non-1st symbol; or
the indication information is used to indicate one of a 0th symbol and a non-0th symbol.

7. The method of claim 6, wherein
the indication information is used to indicate one of the 1st symbol and the 0th symbol; or the indication information is used to indicate one of the 1st symbol and the non-1 st symbol;
the LBT type is one of a second type LBT and a fourth type LBT;
the step of determining the start transmission timing of the current subframe comprises:
when the indication information indicates the 1st symbol, determining that the start transmission timing is the 1st symbol;
when the indication information indicates the 0th symbol or the non-1st symbol, the LBT type is the second type LBT, and the structure of the previous subframe is the complete uplink subframe or the complete downlink special subframe, determining that the start transmission timing is a timing at which a predetermined value elapses after the 0th symbol;
when the indication information indicates the 0th symbol or the non-1st symbol, the LBT type is the second type LBT, and the structure of the previous subframe is the complete downlink subframe, determining that the start transmission timing is a timing at which the predetermined value and a timing advance value elapse after the 0th symbol; and
when the indication information indicates the 0th symbol or the non-1 st symbol, and the structure of the previous subframe is the last-symbol-blank uplink subframe or the last-symbol-blank downlink special subframe or the last-symbol-blank downlink subframe, determining that the start transmission timing is the 0th symbol.

8. The method of claim 6, wherein the indication information is used to indicate one of the 0th symbol and the non-0th symbol;
the LBT type is one of a second type LBT and a fourth type LBT;
the step of determining the start transmission timing of the current subframe comprises:
when the indication information indicates the 0th symbol, determining that the start transmission timing is the 0th symbol;
when the indication information indicates the non-0th symbol, the LBT type is the second type LBT, and the structure of the previous subframe is the complete uplink subframe or the complete downlink special subframe, determining that the start transmission timing is a timing at which a predetermined value elapses after the 0th symbol;
when the indication information indicates the non-0th symbol, the LBT type is the second type LBT, and the structure of the previous subframe is the complete downlink subframe, determining that the start transmission timing is a timing at which the predetermined value and a timing advance value elapse after the 0th symbol; and
when the indication information indicates the non-0th symbol and the LBT type is the fourth type LBT, determining that the start transmission timing is the 1st symbol.

* * * * *